US011983302B2

(12) United States Patent
Young et al.

(10) Patent No.: US 11,983,302 B2
(45) Date of Patent: May 14, 2024

(54) ASSIGNMENT OF SERVICE IDENTITY FOR INFORMATION HANDLING SYSTEMS

(71) Applicant: Dell Products, L.P., Round Rock, TX (US)

(72) Inventors: Jason Matthew Young, Round Rock, TX (US); Aaron M. Randall, Round Rock, TX (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 373 days.

(21) Appl. No.: 17/648,610

(22) Filed: Jan. 21, 2022

(65) Prior Publication Data
US 2023/0237203 A1    Jul. 27, 2023

(51) Int. Cl.
| | |
|---|---|
| *G06F 21/00* | (2013.01) |
| *G06F 21/33* | (2013.01) |
| *G06F 21/44* | (2013.01) |
| *G06F 21/60* | (2013.01) |
| *G06F 21/73* | (2013.01) |

(52) U.S. Cl.
CPC .............. *G06F 21/73* (2013.01); *G06F 21/33* (2013.01); *G06F 21/44* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 2010/0087983 A1* | 4/2010 | Boss | ...................... | G06Q 10/20 701/31.4 |
| 2020/0242859 A1* | 7/2020 | Merg | ................... | G07C 5/0825 |

FOREIGN PATENT DOCUMENTS

| | | | | |
|---|---|---|---|---|
| EP | 4124950 A1 * | 2/2023 | ........... | G06F 9/5044 |
| WO | WO-2019112581 A1 * | 6/2019 | | |

* cited by examiner

*Primary Examiner* — Andrew J Steinle
(74) *Attorney, Agent, or Firm* — Fogarty LLP

(57) ABSTRACT

System and method are provided for assigning a service identifier for use by an IHS (Information Handling System), where a new service identifier may be assigned to the IHS due to replacement of hardware of the IHS. The IHS is provisioned with an inventory certificate that identifies hardware components of the IHS, including a service identifier for the IHS. Support provided for the IHS is tracked based on this service identifier. A hardware component of the IHS is removed, where the service identifier is assigned to this removed hardware component. A replacement hardware component is installed in the IHS. An updated inventory certificate is generated that assigns a new service identifier to the replacement hardware component installed in the IHS. The IHS is provisioned with the updated inventory certificate that specifies the new service identifier. Support provided for the IHS is now tracked based on the new service identifier.

20 Claims, 3 Drawing Sheets

ASSIGNMENT OF SERVICE IDENTITY FOR INFORMATION HANDLING SYSTEMS

FIELD

The present disclosure relates generally to Information Handling Systems (IHSs), and relates more particularly to IHS administration and technical support.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Once an IHS has been delivered and deployed by a customer, the IHS may be supported in several different ways. Technical support may be provided for any or all of the hardware and software of the IHS, where such technical support may be provided by multiple different entities. As part of this technical support hardware and software of the IHS may be replaced and repaired. In some instances, the capabilities of an IHS may be expanded through the addition of new hardware and software to the IHS. Warranties may cover some or all of these technical support operations. In some instances, some or all of these IHS technical support operations may be tracked through a unique identifier that is assigned to the IHS at its manufacture.

Some IHSs, such as rack-mounted servers that are typically deployed within data centers, may be manufactured and customized according to specifications provided by a specific customer that has contracted for the manufacture and delivery of the server. In such instances, a customer may specify various hardware and/or software customizations that configure the server to support specific functionality. Over time, a customer may acquire a large number of such IHSs that may each be customized in various manners. In addition, each IHS may be regularly modified as the software and hardware of the IHS is repaired, replaced and upgraded. Accurately tracking the technical support operations for such IHS is particularly important.

SUMMARY

In various embodiments, methods assign a service identifier for use by an IHS (Information Handling System). The methods may include: provisioning the IHS with an inventory certificate that identifies hardware components of the IHS, wherein the inventory certificate specifies a first service identifier of the IHS, wherein support provided for the IHS is tracked based on the first service identifier; removing a hardware component of the IHS, where the first service identifier is assigned to the removed hardware component; installing a replacement hardware component in the IHS; generating an updated inventory certificate that assigns a second service identifier to the replacement hardware component installed in the IHS; and provisioning the IHS with the updated inventory certificate that specifies the second service identifier for the IHS, wherein support provided for the IHS is tracked based on the second service identifier.

In some method embodiments, the removed hardware component comprises a factory-installed motherboard and wherein the replacement hardware component comprises a replacement motherboard. In some method embodiments, the first service identifier and the second service identifier comprise unique identifiers assigned to the IHS by a manufacturer of the IHS. In some method embodiments, the service identifier is used to authorize a plurality of licensed entitlements for use on the IHS. In some method embodiments, the IHS is provisioned with the inventory certificate specifying the first service identifier during a factory provisioning process. In some method embodiments, the IHS is provisioned with the updated inventory certificate specifying the second service identifier as part of a pre-boot process of the IHS. In some method embodiments, the validation of the inventory certificate compares the first service identifier specified in the inventory certificate of the IHS against a service identifier reported by the first hardware component of the IHS. In some method embodiments, the inventory certificate specifying the first service identifier is bound to the IHS based on a cryptographic identity of the first hardware component. In some method embodiments, the cryptographic identity of the first hardware component comprises an embedded key of a trusted component of the IHS. In some method embodiments, the trusted component comprises at least one of a TPM (Trusted Platform Module) of the IHS and a remote access controller of the IHS. In some method embodiments, the TPM (Trusted Platform Module) is identified in the inventory certificate based on a unique serial number of the TPM. In some method embodiments, the updated inventory certificate specifying the second service identifier is bound to the IHS based on a cryptographic identity of the second hardware component. In some method embodiments, the removed hardware component comprises a factory-installed remote access controller and wherein the replacement hardware component comprises a replacement remote access controller.

In various additional embodiments, IHSs (Information Handling Systems) may include: a first secured memory storing a factory-provisioned inventory certificate identifying a plurality of factory-installed hardware components IHS, and further identifying a first service identifier assigned to the IHS, wherein support is provided for the IHS based on the first service identifier; a second secured memory; one or more processors; one or more memory devices coupled to the processors, the memory devices storing computer-readable instructions that, upon execution by the processors, cause a validation process of the IHS to: detect when the secured memory has been removed from the IHS; issue a request to a remote provisioning application for an updated inventory certificate; receive an updated inventory certificate that identifies the second secured memory and identifies a second service identifier assigned to the IHS; validate the updated inventory certificate; and store the updated inventory certificate specifying the second service identifier to the second secured memory, wherein support is provided for the IHS based on the second service identifier.

In some IHS embodiments, the first secured memory is a component of a factory-installed motherboard and wherein the second secured memory is a component of a replacement motherboard. In some IHS embodiments, the first service identifier and the second service identifier comprise unique identifiers assigned to the IHS by a manufacturer of the IHS. In some IHS embodiments, the validation of the inventory certificate compares the first service identifier specified in the inventory certificate of the IHS against a service identifier reported by the first hardware component of the IHS.

In various additional embodiments, systems may include: a technical support system; an IHS (Information Handling System) comprising: a first secured memory storing a factory-provisioned inventory certificate identifying a plurality of factory-installed hardware components IHS, and further identifying a first service identifier assigned to the IHS, wherein support for the IHS is tracked by the technical support system based on the first service identifier; a second secured memory; one or more processors; one or more memory devices coupled to the processors, the memory devices storing computer-readable instructions that, upon execution by the processors, cause a validation process of the IHS to: detect when the first secured memory has been removed from the IHS; issue a request to a remote provisioning application for an updated inventory certificate; receive an updated inventory certificate that identifies the second secured memory and identifies a second service identifier assigned to the IHS; validate the updated inventory certificate; and store the updated inventory certificate specifying the second service identifier to the second secured memory, wherein support for the IHS is tracked by technical support system based on the second service identifier.

In some system embodiments, the first secured memory is a component of a factory-installed motherboard and wherein the second secured memory is a component of a replacement motherboard. In some system embodiments, the first service identifier and the second service identifier comprise unique identifiers assigned to the IHS by a manufacturer of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
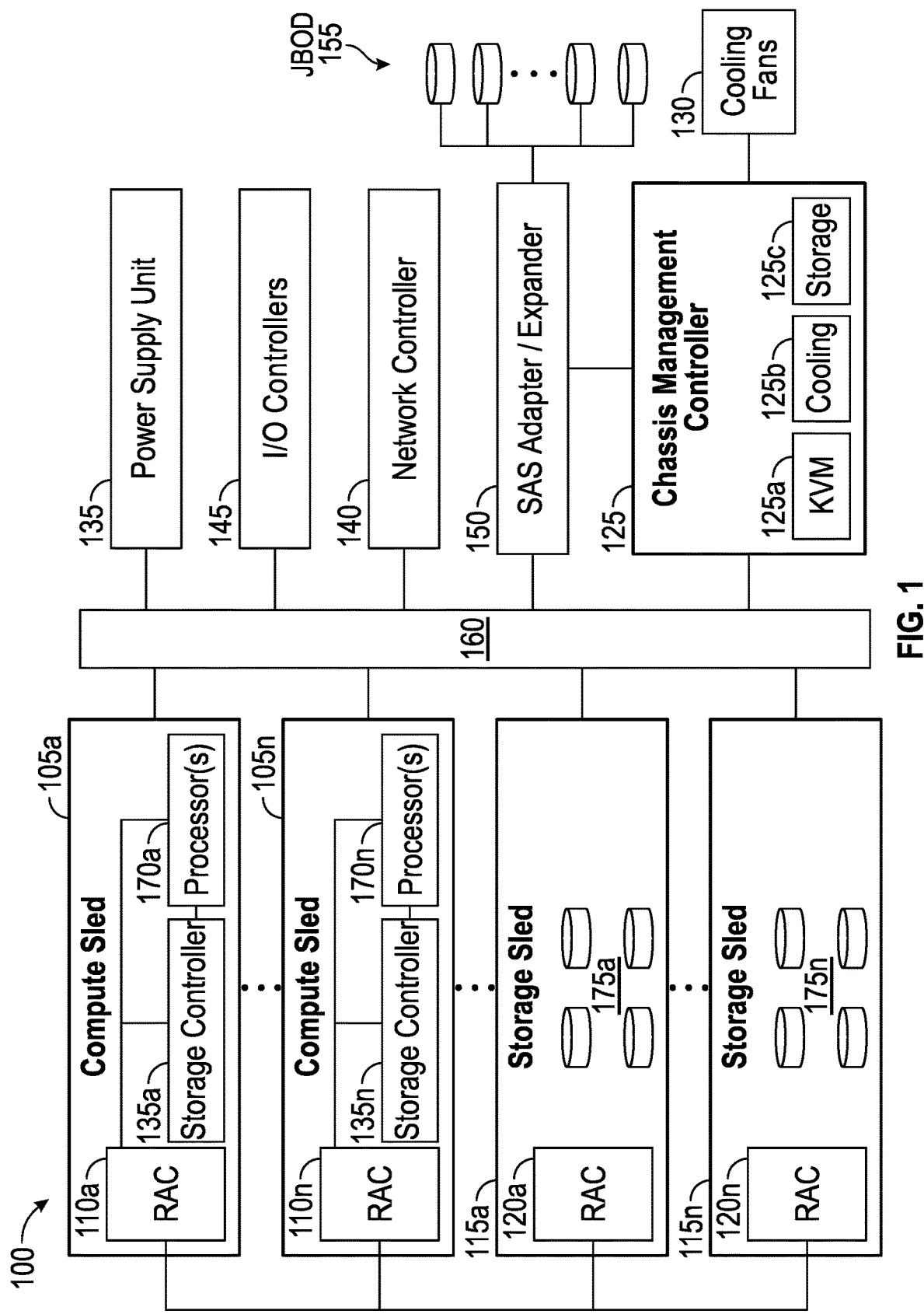
FIG. 1 is a diagram illustrating certain components of a chassis, according to some embodiments, for supporting assignment of service identities of components of the chassis.

FIG. 1 is a block diagram illustrating certain components of a chassis 100 comprising one or more compute sleds 105a-n and one or more storage sleds 115a-n that may be configured to implement the systems and methods described herein for supporting assignment of service identities of components of the chassis. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery and deployment of an IHS, an IHS may be modified by replacing various hardware components of the IHS or by installing new hardware components to the IHS.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100. In some instances, such modifications may be tracked using service tags of the individuals compute sleds 105a-n and/or storage sleds 115a-n.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer.

Embodiments may support validation of backplane 160 as being the same backplane that was installed at the factory during the manufacture of chassis 100. In support of such validations, embodiments may utilize a factory provisioned inventory certificate that is bound to the root of trusted components of a chassis 100. In some instances, the root of trusted components of chassis 100 may include hardware components of the backplane 160. In scenarios where backplane 160 is replaced, embodiments support secure assignment of a new service identity to a replacement backplane, thus supporting technical support for chassis 100 and transfer of entitlements, such as warranties and licenses, to the new backplane 160.

Figure 2:
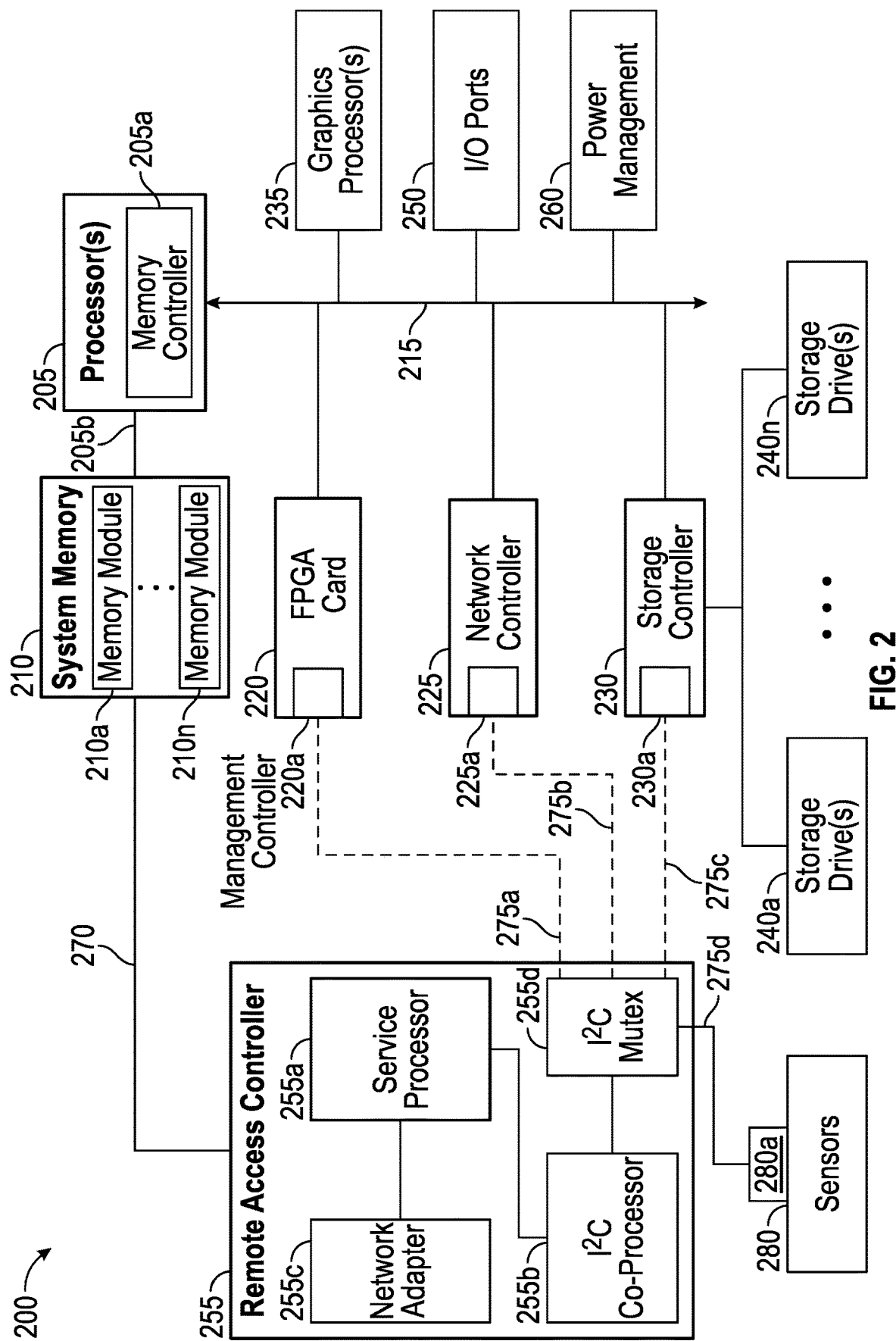
FIG. 2 is a diagram illustrating certain components of an IHS configured, according to some embodiments, for supporting assignment of the service identity of the IHS.

In certain embodiments, a compute sled 105a-n may be an IHS such as described with regard to IHS 200 of FIG. 2. A compute sled 105a-n may provide computational processing resources that may include one or more processors 170a-n and that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect various types of sensor data, such as collecting temperature sensor readings that are used in support of airflow cooling of the chassis 100 and the sleds 105a-n, 115a-n. In addition, each remote access controller 110a-n may implement various monitoring and administrative functions related to compute sleds 105a-n that utilize sideband bus connections with various internal components of the respective compute sleds 105a-n.

Each compute sled 105a-n installed in chassis 100 may be uniquely identified based on a code or other identifier that may be permanently encoded in a non-volatile memory of a respective compute sled 105a-n by its manufacturer. Embodiments may support validation of each compute sled 105a-n as being a compute sled that was installed at the factory during the manufacture of chassis 100. During a provisioning phase of the factory assembly of chassis 100, a signed certificate that specifies an inventory of the hardware components of chassis 100 that were installed during its manufacture may be stored in a secured memory of compute sled 105a-n. Using this signed inventory certificate, a customer may validate that the hardware components of chassis 100 and/or compute sled 105a-n are the same components that were installed at the factory during its manufacture. In some instances, the inventory certificate may refer to the IHS based on a human-readable unique identifier, such as a service tag, that was assigned to the IHS as part of its manufacture. Using such identifiers, various entitlements and technical support related issues may be tracked using a human readable code. For instance, compute sleds 105a-n may be added, removed, upgraded, repaired and replaced within chassis 100 by an administrator. Such administration of compute sleds 105a-n may be tracked based on service tags for compute sleds 105a-n and/or chassis 100.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, embodiments may support validation of SAS expander 150 and storage drives 155 as being the same SAS expander and storage drives that were installed at the factory during the manufacture of chassis 100. In instances where SAS expander 150 and/or storage drives 155 are added, removed, upgraded, repaired or replaced within chassis 100 by an administrator, such technical support operations may be tracked based on service tags for compute sleds 105a-n and/or chassis 100.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115a-n includes a remote access controller (RAC) 120a-n provides capabilities for remote monitoring and management of respective storage sleds 115a-n. In some embodiments, each storage sled 115a-n may be uniquely identified based on a code or other identifier that may be permanently encoded in a non-volatile memory of the respective storage sled 115a-n by its manufacturer. Embodiments may support validation of each storage sled 115a-n as being a storage sled that was installed at the factory during the manufacture of chassis 100. In instances where storage sleds 115a-n are added, removed, upgraded, repaired, or replaced within chassis 100 by an administrator, such operations may be tracked based on service tags for storage sleds 115a-n and/or chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. Embodiments may support validation of network controller 140 as being the same network controller that was installed at the factory during the manufacture of chassis 100. In instances where a network controller 140 is added, removed, upgraded, repaired or replaced within chassis 100 by an administrator, such technical support operations may be tracked based on service tags for chassis 100.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. In some embodiments, a power supply unit 135 may be uniquely identified based on a code or other identifier that may be permanently encoded in a non-volatile memory of the power supply unit 135 by its manufacturer. Embodiments may support validation of power supply unit 135 as being the same power supply unit that was installed at the factory during the manufacture of chassis 100. In instances where power supply unit 135 is added, removed, upgraded, repaired or replaced within chassis 100 by an administrator, such technical support operations may be tracked based on service tags for chassis 100.

Chassis 100 may also include various I/O controllers 145 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 145 may be uniquely identified based on a code or other identifier that may be permanently encoded in a non-volatile memory of the respective I/O controller 145 by its manufacturer. Embodiments may support validation of I/O controllers 145 as being the same I/O controllers that were installed at the factory during the manufacture of chassis 100. In instances where I/O controller 145 is added, removed, upgraded, repaired or replaced within chassis 100 by an administrator, such technical support operations may be tracked based on service tags for chassis 100.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. Embodiments support validation of chassis management controller 125 as being the same chassis management controller that was installed at the factory during the manufacture of chassis 100. In instances where chassis management controller 125 is added, removed, upgraded, repaired or replaced within chassis 100 by an administrator, such technical support operations may be tracked based on service tags for chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting assignment of the service identity of the IHS 200. It should be appreciated that although the embodiments described herein may describe an IHS that is a compute sled or similar computing component that may be deployed within the bays of a chassis, other embodiments may be utilized with other types of IHSs, such as servers, desktops and laptops, that may also support validation of the secure assembly and delivery of the IHS 200 and may support assignment of a service tag identifier to the IHS 200 for use in managing and supporting the IHS, such as tracking entitlements and technical support operations. In the illustrative embodiment of FIG. 2, IHS 200 may be a computing component, such as compute sled 105a-n or other type of server, such as an 1 RU server installed within a 2 RU chassis, that is configured to share infrastructure resources provided by a chassis 100.

The IHS 200 of FIG. 2 may be a compute sled, such as compute sleds 105*a-n* of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configurations may result from IHS 200 being factory assembled to include components specified by a customer that has contracted for manufacture and delivery of IHS 200. IHS 200 may include capabilities that allow a customer to validate that the hardware components of IHS 200 are the same hardware components that were installed at the factory during its manufacture.

As described, an IHS 200 may be assembled and provisioned according to customized specifications provided by a customer. Once the IHS has been shipped and deployed, ongoing technical support may be provided for the IHS 200 based on a unique identifier, such as a service tag or service identifier, that is assigned to IHS 200 as part of its manufacture and/or factory provisioning. A service tag may be logically associated with the IHS 200, and also the factory-installed components of the IHS. A service tag may be utilized to track various aspects of the ongoing support provided for IHS 200. For instance, a record of all administration of IHS 200 by representatives of the manufacturer or other trusted third parties may be maintained in a repository and associated to the IHS 200 based on its service tag identifier. In additional, replacement, repair and support for individual hardware components of IHS 200 may be tracked based on a service tag. Various types of licenses that authorize use of software or content may be authorized for use on IHS 200 based on its service tag. A wide range of additional entitlements, technical support data and other information may be linked to IHS 200 based on its service tag. In some instances, the factory-installed components of an IHS may be specified within a factory-provisioned inventory certificate, to which the service tag of the IHS may be associated.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. Embodiments may support validation of processors 205 as being the same processors that were installed at the factory during the manufacture of IHS 200. In some instances, the motherboard on which processor 205 is mounted may be replaced. As describe in additional detail below, in such instances, embodiments support assignment of a new service tag to the IHS, thus supporting uninterrupted technical support for IHS 200 and also supporting transfer of entitlements to an IHS in scenarios where a motherboard or certain other hardware of the IHS is replaced.

As illustrated, processor(s) 205 includes an integrated memory controller 205*a* that may be implemented directly within the circuitry of the processor 205, or the memory controller 205*a* may be a separate integrated circuit that is located on the same die as the processor 205. The memory controller 205*a* may be configured to manage the transfer of data to and from the system memory 210 of the IHS 205 via a high-speed memory interface 205*b*. The system memory 210 is coupled to processor(s) 205 via a memory bus 205*b* that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor (s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210*a-n* may be uniquely identified based on a code or other identifier that may be permanently encoded in a respective memory module 210*a-n* by its manufacturer. Embodiments may support validation of memory modules 210*a-n* as being the same memory modules that were installed at the factory during the manufacture of IHS 200. In instances where memory modules 210*a-n* are added, removed or replaced within IHS 200 by an administrator, such operations may be tracked based on the service tag of IHS 200.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. Embodiments support validation of FPGA card 220 as being the same FPGA card that was installed at the factory during the manufacture of IHS 200. In instances where FPGA card 220 is added, removed, repaired, upgraded or replaced within IHS 200 by an administrator, such operations may be tracked based on the service tag of IHS 200.

IHS 200 may include one or more storage controllers 230 that may be utilized to access storage drives 240a-n that are accessible via the chassis in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In embodiments where storage drives 240a-n are hot-swappable devices that are received by bays of chassis, the storage drives 240a-n may be coupled to IHS 200 via couplings between the bays of the chassis and a midplane of IHS 200. In some embodiments, storage drives 240a-n may also be accessed by other IHSs that are also installed within the same chassis as IHS 100. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations. Embodiments may support validation of storage drives 240a-n as being the same storage drives installed at the factory during the manufacture of IHS 200. In some embodiments, storage controller 230 may be uniquely identified based on a code or other identifier that may be permanently encoded in a non-volatile memory of storage controller 230 by its manufacturer. Embodiments may support validation of storage controller 230 as being the same storage controller that was installed at the factory during the manufacture of IHS 200. In instances where storage controller 230 and/or storage drives 240a-n are added, removed, repaired, upgraded or replaced within IHS 200 by an administrator, such operations may be tracked based on the service tag of IHS 200.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. Embodiments support validation of network controller 225 as being the same network controller that was installed at the factory during the manufacture of IHS 200. In instances where network controller 225 is added, removed, repaired, upgraded or replaced within IHS 200 by an administrator, such operations may be tracked based on the service tag of IHS 200.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. Embodiments support validation of these components as being components that were installed at the factory during the manufacture of IHS 200. In instances where these components are added, removed, repaired, upgraded or replaced within IHS 200 by an administrator, such operations may be tracked based on the service tag of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200. In some embodiments, remote access controller 255 may be uniquely identified based on a code or other identifier that may be permanently encoded in a non-volatile memory of the remote access controller 255 by its manufacturer. Embodiments may support validation of remote access controller 255 as being the same controller that was installed at the factory during the manufacture of IHS 200.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key that may be used in digitally signing inventory information collected during the factory assembly of IHS 200, and the service tag identifier of the IHS, such that the integrity of this signed inventory information may be validated at a later time using the public key by a customer that has purchased IHS 200. Using these cryptographic capabilities of the remote access controller, the service tag and the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information and service tag identifier that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255. In some embodiments, the remote access controller 255 may rely on certain cryptographic capabilities of a TPM, such as in storing keypair, generating keypairs, calculating cryptographic signatures (e.g., hashes) and/or providing a persistent and secure memory for storage of the keypair used by the hardware validation procedures described in more detail below.

As described, various hardware components of an IHS 200 may be replaced as part of providing ongoing technical support for IHS 200, whether to upgrade or alter the capabilities of IHS 200 or to replace a failed or malfunctioning component. In some scenarios, a motherboard of an IHS may be replaced. As a consequence, all of the components that are mounted to the motherboard are also replaced. In some embodiments, a remote access controller 255 may be implemented through a component that is mounted to a motherboard of an IHS 200. In embodiments where remote access controller 255 controls the private key that has been used to sign the inventory information included in an inventory certificate, the replacement of the motherboard on which the remote access controller 255 is mounted results in a loss of the inventory certificate and the cryptographic credentials for which ownership is established by the signed inventory certificate. Accordingly, replacement of a motherboard may thus require the generation of a new inventory certificate for the IHS 200. Even if the inventory certificate is loaded onto the replacement motherboard, the remote access controller of this replacement motherboard does not have the cryptographic credentials that are required to decipher the digital signatures included in the certificate.

As described above, technical support of various types that is provided for IHS 200 may be tracked utilizing a service identifier for the IHS. In some instances, such service identifiers may be associated with a specific IHS by linking the service identifier to the inventory certificate of the IHS. In other instances, the service identifier may be linked to the remote access controller 255 that generated the signed inventory that is included in the certificate. In either case, replacing a remote access controller of an IHS results in loss of the link to the service identifier of the IHS. The history of entitlements and technical support for IHS 200 is thus no longer linked to the IHS after a motherboard replacement. As described in additional detail below, a signed inventory certificate may be used to validate the hardware of an IHS. Upon replacement of a motherboard, such inventory certificate validations may be utilized to confirm the validity of the updated hardware of the IHS. In some embodiments, such validations may also detect the described disassociation of a service identifier with the IHS that results from a motherboard replacement. In such embodiments, the inventory certificate validation process of an IHS may provide capabilities for initiating a transfer of the service identity of the replaced motherboard to the replacement motherboard that has been installed in the IHS.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
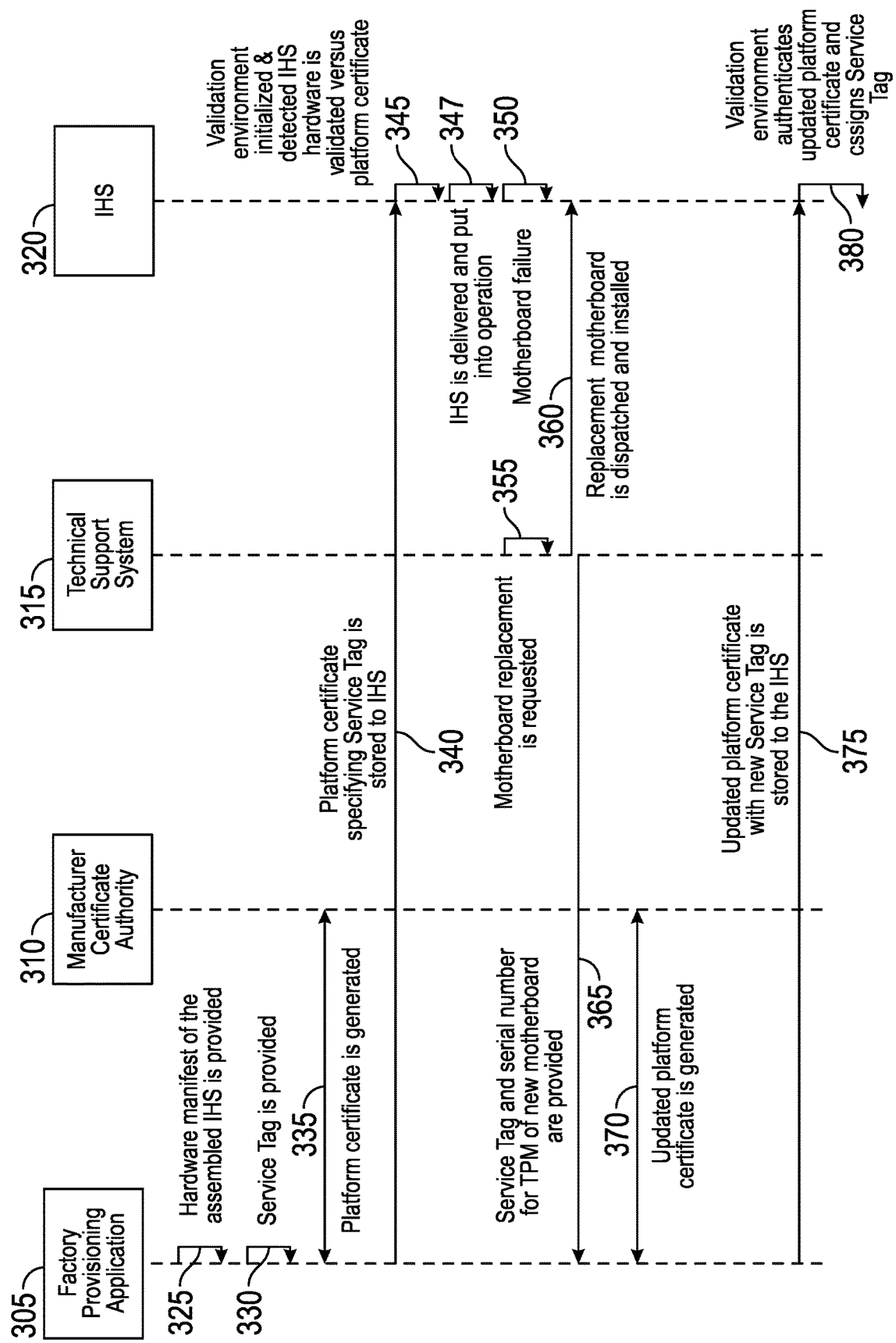
FIG. 3 is a flowchart describing certain steps of a method, according to some embodiments, for assignment of a service identity of an IHS.

FIG. 3 is a swim lane diagram illustrating certain responsibilities of components of a system configured according to certain for factory provisioning of an IHS in a manner that supports assignment of a service identity to the IHS. Some embodiments may begin with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers, that may themselves by IHSs, and may interface with an IHS that is being provisioned once a requisite amount of firmware or other software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 325, a manifest generated during assembly of an IHS is provided to the factory provisioning application 305 that is being used to provision the assembled IHS. In particular, the manifest may specify a TPM module, or other trusted component such as the described remote access controller, that maintains cryptographic information for use in validating the detected hardware of the IHS against the factory provisioned inventory certificate. In some embodiments, the manifest may specify a serial number that is associated with the TPM, or with a particular embedded keypair that is safeguarded by the TPM for use in authenticating the IHS using the inventory certificate.

As indicated in FIG. 3, at 330, the factory provision application 305 is also provided with a service tag or other identifier to be associated with the IHS and to serve as a unique identifier of the IHS. A service tag may be used in various manners, such as in tracking technical support and entitlements for the IHS once it has been deployed. A service tag is preferable human readable and simple enough to be of practical use to a human in obtaining support for an IHS. In some embodiments, the service tag may already be included in the manifest since the service tag may be assigned during, or even prior to, the assembly of the IHS.

Based on this hardware manifest information, at 335, the factory provisioning application may also initiate the generation of an inventory certificate that may be used to validate the authenticity of the detected hardware components of the IHS, and of the assigned service tag of the IHS. As described with regard to FIGS. 1 and 2, an IHS may include a remote access controller that provides capabilities for remote management of an IHS, where these remote management capabilities may include sideband management of various hardware components of an IHS. In some embodiments, the generation of an inventory certificate for a newly assembled IHS may be initiated via a request from the factory provisioning application 305 to the remote access controller of the IHS. In such instances, a remote access controller of an IHS includes cryptographic capabilities that operate within the root of trust of the IHS and that include the ability to generate cryptographic keypairs. Utilizing such cryptographic capabilities, the remote access controller may generate a cryptographic key pair for use as an embedded keypair for use in validating the inventory certificate and determining the authenticity of detected components of the IHS. In some embodiments, this embedded keypair may be provided by the TPM. Using the embedded keypair of the IHS, the manifest provided to the factory provisioning application and specifying the factory installed hardware inventory of the IHS may be signed by the IHS 320.

In some embodiments, the factory provision application 305 generates a certificate signing request (CSR) for a digital identity certificate, where the request specifies the cryptographic credential that will be used to identify the IHS, such as a public key of the embedded key pair generated by the remote access controller or TPM. The CSR also specifies the factory installed hardware inventory from the manifest that was generated during assembly of the IHS, a signature of the manifest generated using the embedded keypair of the IHS, and the service identifier for the IHS. As indicated at 335, the CSR for the requested inventory certificate may be transmitted for signing by a certificate authority 310 of the manufacturer.

Upon receipt of the CSR, the manufacturer's certificate authority 310 parses from the CSR: the hardware inventory information, the public key used to identify the IHS and the information specifying the requested signing key. Based this information, the manufacturer's certificate authority 310 generates a digital identity certificate, referred to herein as an inventory certificate, that is associated with the public key presented by the factory provisioning application 305 and that specifies the factory installed hardware inventory of the IHS, and the service identifier assigned to the IHS by the manufacturer. As described in additional detail below, in embodiments, this inventory certificate may be updated or replaced at a later time in response to replacement of hardware of an IHS, such as the motherboard, that results in a disassociation of the service identifier from the IHS, where the updating of the inventory certificate serves to also assign a new service tag identifier to the IHS.

In some instances, the factory certificate authority 315 submits the generated inventory certificate for signing by a hardware security module (HSM) that may be a dedicated hardware component of a factory provisioning system, where the HSM safeguards cryptographic keys and implements cryptographic functions utilized in the factory provisioning process. The HSM utilizes a safeguarded private key in order to digitally sign the submitted inventory certificate, which includes the inventory of the factory installed hardware components of the IHS and the service identifier for the IHS. Once the inventory certificate has been signed, it is provided to the factory provisioning application 305, which may store a copy of the signed inventory certificate. In some instances, the copy may be saved to a data store utilized in providing ongoing support of the IHS once it has been shipped and has been deployed by a customer.

At 340, the signed inventory certificate is than loaded to the assembled IHS 320 by the factory provision application 305. In some embodiments, the signed inventory certificate may be uploaded to a remote access controller of the assembled IHS 320, such that the signed inventory certificate may be stored to a nonvolatile memory or other persistent storage that is accessible by the remote access controller independent from the operating system of the IHS. In other embodiments, the signed inventory certificate may be uploaded without reliance on the remote access controller to another non-volatile memory of the IHS 320, such as to a TPM of the IHS 320.

Some embodiments may continue, at 345, with the validation of the signed inventory certificate by the IHS 320, in some cases through the use of validation environment of the IHS 320. Once the authenticity of the inventory certificate is validated, the service tag specified in the inventory certificate may be programmed for use as the unique identifier that has been assigned to the IHS 320 by its manufacturer. In some embodiments, the service tag specified in the inventory certificate is encoded in a secured memory of the IHS. In some embodiments, the secured memory of the IHS may be one-time programmable memory, which may include programmable registers or fuses. In some embodiments, the secured memory used to encode the service tag of the IHS 320 may be maintained by the remote access controller of the IHS.

With the validation of the signed inventory certificate completed and a service tag assigned to the IHS, additional factory provisioning of the assembled IHS 320 may be completed. At 347, the assembled IHS may be shipped from the factory to a customer, where it is put into operation. Upon delivery of the IHS 320, embodiments may provide a capability for validating that the delivered IHS includes only hardware components that were installed at the factory during manufacture of the IHS, and validating the service tag being reported by the IHS. Embodiments thus support an initial validation of the secure assembly and delivery of an IHS. Such validations may be repeated each time an IHS is initialized, or in response to detected security conditions.

Upon receiving an IHS 320 that has been configured as described, the IHS may be unpacked, assembled and initialized by an administrator. In some instances, a validation environment may be initialized as part of the initial provisioning of an IHS 320 by a customer. In other instances, the validation process may be initialized upon the customer installing new and/or replacement hardware components in the IHS. In some embodiments, the validation environment may be a pre-boot environment, such as a PXE (Preboot eXecution Environment) environment. In some embodiments, the validation environment may be retrieved from a network location and executed using the processing and memory capabilities of the IHS 320. In some embodiments, the validation environment may be retrieved using secure protocols, such as HTTPS, in order to assure the integrity of the validation environment instructions that are utilized. In some embodiments, a validation environment many be an environment executed by the remote access controller of the IHS 320 based on validated firmware instructions.

Within such a validation environment, a process parses the hardware inventory information and service tag from the signed inventory certificate that was stored to the IHS 320 during factory provisioning. Using the public key provided in the signed inventory certificate, the process confirms the integrity of the inventory and service tag information that is included in the signed inventory certificate. The validation process may utilize the private key of the embedded keypair generated during factory provisioning, to calculate a signature based on the hardware inventory and service tag included in the certificate. If this signature matches the signed inventory signature included in the certificate, the integrity of the inventory information and service tag included in the certificate is confirmed.

If the validity is confirmed, the validation process may collect an inventory of the detected hardware components of the IHS. The validation process may query various components the IHS 320 to generate an inventory of the detected hardware components of the IHS. The validation process compares the collected inventory information against the inventory information from the signed inventory certificate. The validation process also compares the service identity included in the inventory certificate against a detected service identity of the IHS, such as a service tag reported by the remote access controller and/or various other components. If the detected components and service tag match the signed inventory from the certificate, the validation process has successfully confirmed that the IHS 320 includes only factory-installed hardware, with none of the factory-installed hardware missing and no detection of any unidentified hardware, and that the service tag in use is the factory provisioned service tag of the IHS. The customer receiving delivery of the IHS is thus assured that the IHS 320 has not been compromised.

However, once an IHS has been validated and deployed by a customer, various modifications may be made to the IHS. Modifications to an IHS may be required due to failure, at 350, of a motherboard or backplane of an IHS to which processors and other core components of the IHS are fixed. For instance, core components such as a remote access controller, a TPM and secure memory devices may be fixed to a motherboard of an IHS. As described above, such core components may be utilized to establish a root of trust that includes hardware components that operate using validated instructions. Also as described above, embodiments may cryptographically bind a signed inventory certificate to components operating within this root of trust of an IHS. For instance, an embedded key of the IHS 320, that may be maintained by a remote access controller or a TPM, may be used to digitally sign inventory information that is included in an inventory certificate. In scenarios that require replacement of a motherboard, backplane, daughter card or other circuit board of an IHS that includes one or more of such hardware components to which an inventory certificate is digitally bound, an existing inventory certificate that is bound to these replaced components cannot be validated by the components of the replacement board that will operate using different cryptographic credentials. For instance, in embodiments where a private key of a remote access controller is used to digitally sign the inventory and service tag in an inventory certificate, replacement of a motherboard to which the remote access controller is mounted results in that private key no longer being available for use in validating the detected inventory and service tag of the IHS 320 against the signed inventory from the certificate.

At 355, a replacement motherboard is requested from a technical support system 315 for installation in the IHS 320. A replacement motherboard may be installed by an administrator that requests the motherboard from a technical support system 315 operated by the manufacturer of the IHS 320 or by a trusted entity providing technical support on behalf on the manufacturer. In some instances, a replacement motherboard or other circuit board is shipped by the technical support system 315 to a customer for installation in an IHS 320 by the administrator. In other instances, a replacement motherboard may be sold to a customer via a retail transaction that is reported to the technical support system 315. As described, due to the replacement of the motherboard, the technical support information relating to IHS 320 that is maintained by the technical support system 315 is still associated with the failed motherboard that has been removed from the IHS.

Accordingly, in response to issuing a new motherboard for installation in the IHS 320, the technical support system 315 may assign a service tag for use in tracking the IHS 320. In some embodiments, the technical support system 315 may retrieve an available service tag to assign to the replacement motherboard from a master repository of service tags maintained by the manufacturer of the IHS and made available to the technical support system 315 providing support to the embodiments described herein. As indicated in FIG. 3, in conjunction with providing the replacement motherboard for installation in the IHS 320, at 365 the technical support system 315 provides the factory provisioning application 305 with notification of the replacement. In particular, the technical support system 315 may provide the factory provisioning application 305 with a service tag that has been assigned to the replacement motherboard, and thus to the IHS. In some embodiments, the replacement motherboard may be identified to the factory provisioning application 315 using a unique serial number of the embedded keypair of the remote access controller or TPM that will be used to authenticate the IHS and the service identifier in use by the IHS.

In some embodiments, the technical support system 315 may maintain a technical support datastore. A wide variety of information associated with an IHS 320 may be maintained in such a datastore for use in supporting use of applications and services by the IHS 320 and for providing technical support for hardware and software of the IHS 320. In addition, third parties providing technical support or repair service for an IHS may submit records to a technical support datastore. Various sales records and configuration information for the IHS 320 may also be maintained in such a datastore. Entitlements such as warranties and licenses that are bound to the IHS may be tracked in the datastore based on the service tag of the IHS 320. As described, all such entries for IHS 320 within a technical support datastore may be logically associated with IHS 320 based on the service identifier of that IHS 320. However, despite the replacement of the motherboard of an IHS, the records in the technical support datastore are still associated with the service tag of the failed motherboard. Accordingly, in response to an assignment of a new service identity to the IHS 320, the technical support datastore may be updated such that entries for the prior service tag are now also associated with the service tag assigned to the replacement motherboard.

The replacement motherboard is received by an administrator and physically installed in the IHS 320. Upon being initialized using the replacement motherboard, at 380, the boot instructions of IHS 320 may initiate the validation process described above. Once the validation process of the IHS 320 is booted, the validation process may trigger procedures for validation of the hardware of the IHS, now using the replacement motherboard and against the received updated inventory certificate. As described above, an inventory of the detected hardware components of the IHS 320 may be generated by the validation process. Now operating using the replacement motherboard, the validation process may query the BIOS, remote access controller and/or TPM of the replacement motherboard in order to generate an inventory of detected hardware components of the IHS. In some embodiments, upon detecting a new motherboard, the validation process may issue a signal to the factory provisioning application of readiness to receive an updated inventory certificate for the new motherboard.

Upon generating an updated inventory certificate that assigns a new service tag to the IHS, at 370, the factory provisioning application 305 may monitor for a notification from IHS 320 of the motherboard's readiness for an updated inventory certificate. In generating the updated inventory certificate, the factory provisioning application generates a certificate signing request (CSR) that includes the hardware inventory of the IHS, now including the replacement motherboard that may be identified based on a serial number of an embedded keypair of the motherboard, and the assigned service tag for use by the IHS 320. As with the original CSR, the public key of the embedded keypair of IHS 320 is included in the CSR for the updated inventory certificate, thus binding the resulting updated inventory certificate and the assigned service tag to the replacement motherboard. The CSR is transmitted to the manufacturer certificate authority 310. As with the original inventory certificate, upon receipt of the CSR, the manufacturer certificate authority 310 extracts the hardware inventory information included in the CSR. From the received CSR, the manufacturer certificate authority 310 generates an updated inventory certificate that specifies the hardware inventory reported in the CSR, including the replacement motherboard, and the assigned service tag. As before, the updated inventory certificate that is generated by the manufacturer's certificate authority 310 may be signed utilizing credential maintained by a hardware security module (HSM).

As described, the validation environment of the IHS 320 may issue a signal to the factory provisioning application 305 upon begin booted and a new motherboard is detected. In response to such a signal, at 375, the factory provisioning application 305 transmits the updated inventory certificate to the IHS 320. Upon receipt of the updated inventory certificate, the hardware inventory information and the service tag included in the new inventory certificate may be validated, at 380, by the validation process. In particular, the validation process may validate the authenticity of the updated certificate using the public key of the factory certificate authority 310 that generated the updated certificate. Upon successful validation of the hardware inventory and the assigned service tag, the validation process may store the updated inventory certificate to a persistent memory for use in continued validation of the detected service tag and the detected hardware components of the IHS during its ongoing use by the customer. In some embodiments, the persistent memory may be identified based on the updated inventory certificate, such as to the TPM storing an embedded keypair that is identified by serial number within the inventory. Upon validation of the service tag from the certificate, the validation process may also initiate programming of the service tag in a secured memory of the IHS, such as a one-time programmable memory maintained by the remote access controller. Using this new service tag, technical support information and entitlements, such as licenses and warranties, that were associated with the service tag of the prior motherboard may resume, now using the assigned service tag of the replacement motherboard.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for assigning a service identifier for use by an IHS (Information Handling System), the method comprising:

provisioning the IHS with an inventory certificate that identifies hardware components of the IHS, wherein the inventory certificate specifies a first service identifier of the IHS, wherein support provided for the IHS is tracked based on the first service identifier;

removing a hardware component of the IHS, where the first service identifier is assigned to the removed hardware component;

installing a replacement hardware component in the IHS;

generating an updated inventory certificate that assigns a second service identifier to the replacement hardware component installed in the IHS; and provisioning the IHS with the updated inventory certificate that specifies the second service identifier for the IHS, wherein support provided for the IHS is tracked based on the second service identifier.

2. The method of claim 1, wherein the removed hardware component comprises a factory-installed motherboard and wherein the replacement hardware component comprises a replacement motherboard.

3. The method of claim 1, wherein the first service identifier and the second service identifier comprise unique identifiers assigned to the IHS by a manufacturer of the IHS.

4. The method of claim 1, wherein the service identifier is used to authorize a plurality of licensed entitlements for use on the IHS.

5. The method of claim 1, wherein the IHS is provisioned with the inventory certificate specifying the first service identifier during a factory provisioning process.

6. The method of claim 1, wherein the IHS is provisioned with the updated inventory certificate specifying the second service identifier as part of a pre-boot process of the IHS.

7. The method of claim 1, wherein the validation of the inventory certificate compares the first service identifier specified in the inventory certificate of the IHS against a service identifier reported by the first hardware component of the IHS.

8. The method of claim 1, the inventory certificate specifying the first service identifier is bound to the IHS based on a cryptographic identity of the first hardware component.

9. The method of claim 8, wherein the cryptographic identity of the first hardware component comprises an embedded key of a trusted component of the IHS.

10. The method of claim 9, wherein the trusted component comprises at least one of a TPM (Trusted Platform Module) of the IHS and a remote access controller of the IHS.

11. The method of claim 10, wherein the TPM (Trusted Platform Module) is identified in the inventory certificate based on a unique serial number of the TPM.

12. The method of claim 1, wherein the updated inventory certificate specifying the second service identifier is bound to the IHS based on a cryptographic identity of the second hardware component.

13. The method of claim 1, wherein the removed hardware component comprises a factory-installed remote access controller and wherein the replacement hardware component comprises a replacement remote access controller.

14. An IHS (Information Handling System) comprising:
a first secured memory storing a factory-provisioned inventory certificate identifying a plurality of factory-installed hardware components IHS, and further identifying a first service identifier assigned to the IHS, wherein support is provided for the IHS based on the first service identifier;
a second secured memory;
one or more processors;
one or more memory devices coupled to the processors, the memory devices storing computer-readable instructions that, upon execution by the processors, cause a validation process of the IHS to:
detect when the first secured memory has been removed from the IHS;
issue a request to a remote provisioning application for an updated inventory certificate;
receive an updated inventory certificate that identifies the second secured memory and identifies a second service identifier assigned to the IHS;
validate the updated inventory certificate; and
store the updated inventory certificate specifying the second service identifier to the second secured memory, wherein support is provided for the IHS based on the second service identifier.

15. The IHS of claim 14, wherein the first secured memory is a component of a factory-installed motherboard and wherein the second secured memory is a component of a replacement motherboard.

16. The IHS of claim 14, wherein the first service identifier and the second service identifier comprise unique identifiers assigned to the IHS by a manufacturer of the IHS.

17. The IHS of claim 14, wherein the validation of the inventory certificate compares the first service identifier specified in the inventory certificate of the IHS against a service identifier reported by the first hardware component of the IHS.

18. A system comprising:
a technical support system;
an IHS (Information Handling System) comprising:
a first secured memory storing a factory-provisioned inventory certificate identifying a plurality of factory-installed hardware components IHS, and further identifying a first service identifier assigned to the IHS, wherein support for the IHS is tracked by the technical support system based on the first service identifier;
a second secured memory;
one or more processors;
one or more memory devices coupled to the processors, the memory devices storing computer-readable instructions that, upon execution by the processors, cause a validation process of the IHS to:
detect when the first secured memory has been removed from the IHS;
issue a request to a remote provisioning application for an updated inventory certificate;
receive an updated inventory certificate that identifies the second secured memory and identifies a second service identifier assigned to the IHS;
validate the updated inventory certificate; and
store the updated inventory certificate specifying the second service identifier to the second secured memory, wherein support for the IHS is tracked by technical support system based on the second service identifier.

19. The system of claim 18, wherein the first secured memory is a component of a factory-installed motherboard and wherein the second secured memory is a component of a replacement motherboard.

20. The system of claim 18, wherein the first service identifier and the second service identifier comprise unique identifiers assigned to the IHS by a manufacturer of the IHS.

* * * * *